March 31, 1964 S. EPSTEIN 3,126,743
THERMOCOUPLE REFERENCE JUNCTION
Filed Sept. 18, 1958 2 Sheets-Sheet 1
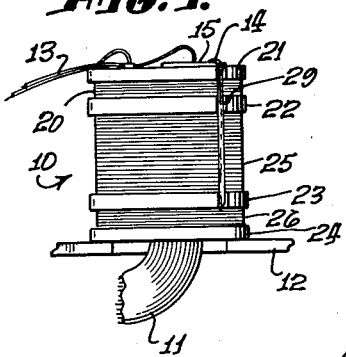
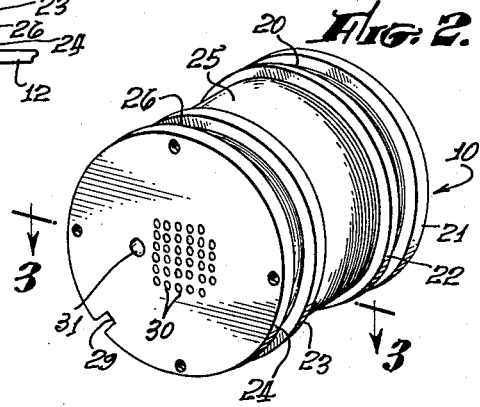
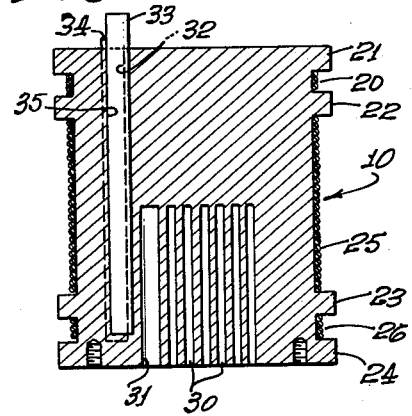
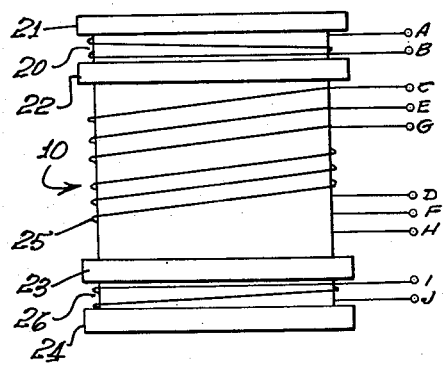
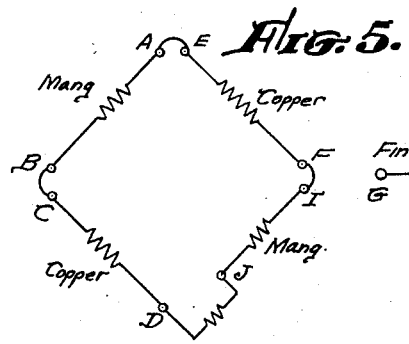
SAUL EPSTEIN,
INVENTOR.
BY *Martin R. Hodge*
ATTORNEYS.

March 31, 1964     S. EPSTEIN     3,126,743
THERMOCOUPLE REFERENCE JUNCTION
Filed Sept. 18, 1958     2 Sheets-Sheet 2
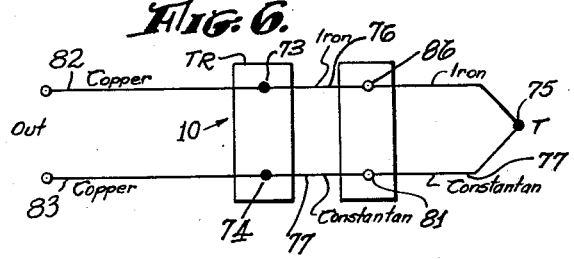
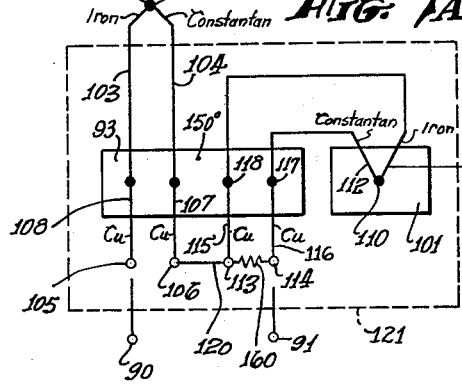 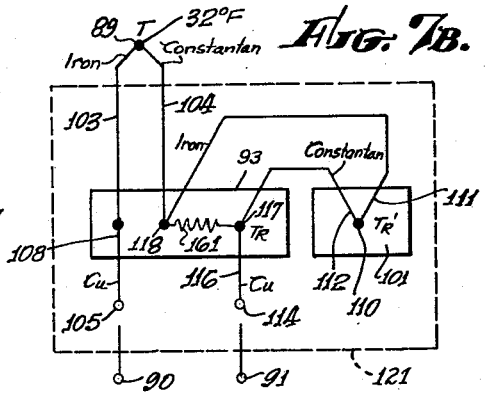
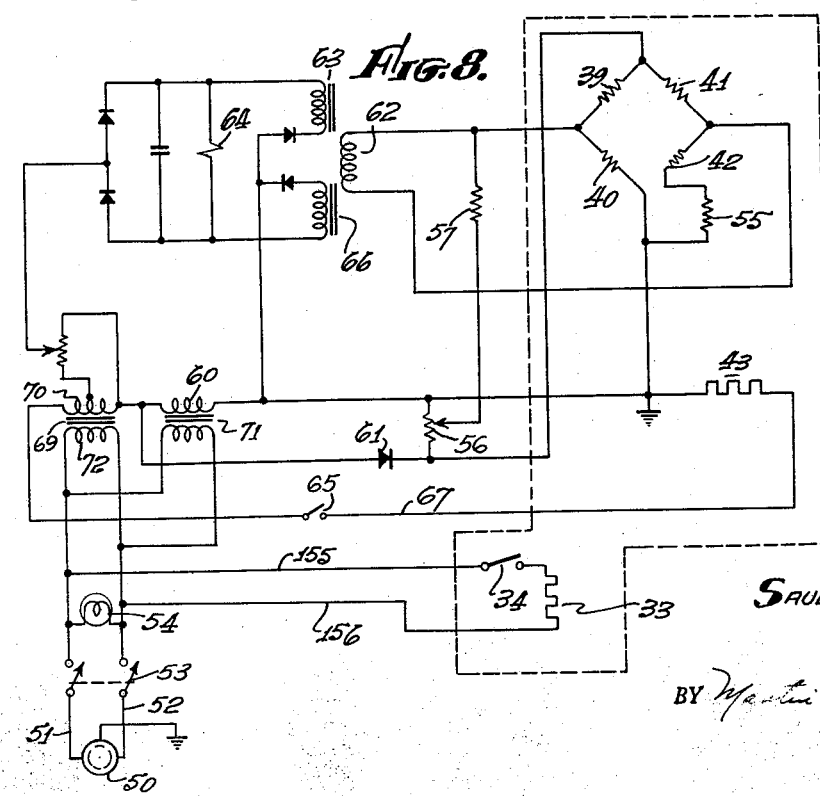
SAUL EPSTEIN,
INVENTOR.
BY
ATTORNEYS.

United States Patent Office 3,126,743
Patented Mar. 31, 1964

3,126,743
THERMOCOUPLE REFERENCE JUNCTION
Saul Epstein, 5015 Varna Ave., Sherman Oaks, Calif.
Filed Sept. 18, 1958, Ser. No. 761,760
2 Claims. (Cl. 73—359)

This invention relates to thermocouples and more particularly to a stable temperature reference system for a plurality of thermocouples.

A thermocouple is a well known type of thermometer and consists basically of two wires of dissimilar materials, such as iron and constantan, joined together at the ends to form a closed circuit. If one junction of this circuit is at a higher temperature than the other junction, a current will flow because of an electrical potential difference between the two junctions, and if the circuit is broken, the potential difference may be read with a meter using the same material for a lead as is the wire in the portion of the circuit that is broken. If one junction is then at a known temperature the measured potential difference will be a function of the temperature of the other junction.

Since most electrical measuring instruments are made of copper, the measuring thermocouple leads are usually brought back to a region of uniform known temperature at a reference junction in which are located junctions between the thermocouple materials and copper. Copper connections are then made to the measuring circuit. The measured voltage is a function of the thermocouple wire characteristics, the probe temperature, and the reference temperature. According to the prior at, an ice bath was provided to produce a reference temperature of 32° F. and standard tables were made for conversion of millivolt readings to temperature based on this standard.

Multi-channel thermocouple systems have recently come into use in industrial and research installations. These newer systems are typically equipped with heated, thermostatically controlled reference junctions, which represent an improvement over the prior art ice bath system in that they permit greater operating convenience and in many applications result in greater accuracy. Temperature values are derived as for the ice bath, using either the 32° F. tables and correcting for the reference temperature difference, or tables prepared for direct use with the heated reference junction. Complete tables for common thermocouple materials are available, for example, for 150° F. Accordingly the present invention will be described making use of a 150° F. heated reference by way of example.

As will be explained hereinafter when the temperature being measured varies from a temperature below that of the reference to a temperature thereabove, there will be a reversal in the polarity of the output voltage of the circuit. In order to eliminate this polarity reversal and for other reasons to be discussed, it is often desirable to have a reference temperature which is below the ambient. The present invention provides a novel compound heated reference junction system which incorporates a bucking junction to achieve an effective below ambient reference temperature.

It is therefore an object of the present invention to provide an improved heated uniform temperature thermocouple junction reference system.

Another object of the present invention is to provide an improved heated uniform temperature reference junction block.

Yet a further object of the present invention is to provide an improved system for maintaining a heated temperature reference block at a uniform temperature to within tolerances heretofore unobtainable.

Another object of the present invention is to provide a unique heated uniform reference junction system which simulates a below ambient temperature.

In accordance with the presently preferred embodiment of this invention there is provided a substantially massive aluminum block generally cylindrical in shape. The block has a central section defined by two opposing flange sections which are symmetrically disposed about the central section in planes perpendicular to the central axis of the cylindrical block. Two similar flanges extending from the top and bottom of the block define a first and a second end section. In accordance with the presently preferred embodiment of the invention the height of the end sections is less than that of the central section.

Wound around each of the end sections is a fine manganin wire. Within the central section are wound three separate copper wires forming three layers. All of the wires have an intimate insulator coating such as formaldehyde or a high grade enamel. The inner two copper windings disposed about the central section of the block are connected at each end to the manganin wires to form a bridge. The top or outer copper winding is a heater winding which is connected to an external power supply.

A plurality of holes parallel to the central axis of the cylinder shaped block are disposed halfway into the block from the bottom end thereof. These holes are of a small diameter and are generally centrally located.

Two holes somewhat larger than the smaller ones, above mentioned, are provided through the top of the block. These holes are also parallel with the central axis of the block and extend almost entirely to the opposite face thereof. Within one of these larger holes is disposed a cartridge heater of a type well known to the art while a thermostat is disposed within the other. The cartridge heater is connected to a power supply and is arranged to heat the block to a temperature within a few degrees of that desired, i.e., the thermocouple reference temperature, at which point the thermostat cuts off the cartridge heater.

The fine copper windings previously mentioned serve to bring the block to the very temperature desired. When the block is at the predetermined temperature the resistance of the two copper windings hereinbefore discusssed equals the resistance of the two manganin windings and the bridge is in balance. If the temperature of the block should go up or down the bridge will become unbalanced and thus produce an output potential which controls a fine heater circuit thus again bringing the bridge into balance.

The thermocouple junctions to be heated to the reference temperature are placed within the small holes; each hole may accommodate more than one thermocouple junction, if desired. The block is made of aluminum, an excellent conductor, and being of a relatively large mass has substantially no temperature gradients therein especially at the bottom of the holes which receive the junctions. With the externally wound copper heating wire, and the bridge control system, in accordance with the present invention it has been found that the temperature of the reference junctions may be regulated to within $\frac{1}{10}°$ F. at a temperature of 150° F., for example.

The novel features which are believed to be characteristic of the present invention both as to its organization and method of operation, together with further objects and advantages thereof, will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

In the drawings:

FIGURE 1 is an elevation view showing a thermocouple reference junction device in accordance with the present invention;

FIGURE 2 is a perspective view of the device of FIGURE 1 as it would appear when rotated 90°;

FIGURE 3 is a cross-sectional view of the device of FIGURE 1;

FIGURE 4 is a somewhat enlarged front elevation of the device of FIGURE 1 schematically showing the various windings thereupon;

FIGURE 5 is a schematic view showing the interconnection of the windings of FIGURE 4;

FIGURE 6 is a schematic view of the basic heated reference junction circuit;

FIGURE 7A is a schematic view of a below ambient heated reference junction system in accordance with the present invention;

FIGURE 7B shows a simplified form of the system of FIGURE 7A; and

FIGURE 8 is a schematic view of a circuit illustrative of the type which may be used in conjunction with the present invention as shown in FIGURE 7B.

Referring now to the drawings and more particularly to FIGURE 1, there is shown a heated reference junction block 10 in accordance with the presently preferred embodiment of this invention. The block 10 has a cable 11 extending from the bottom thereof through a hole provided therefor in support 12. Another cable 13 is shown to be extending from the top of the block 10, which cable 13 leads from cable 14 to terminal board 15. Terminal board 15 provides a terminus for the ends of the wires forming the windings A—B, C—D, E—F, G—H and I—J shown in FIGURE 4. Winding A—B, consists of a fine manganin wire coated with an insulating material such as Formex which is the trademark for a formaldahyde coating manufactured by the General Electric Company. Of course, any other suitable insulator coating may alternatively be used such as a high quality enamel.

Referring now to FIGURE 4 winding A—B is disposed about top section 20 of block 10 which is defined by flanges 21 and 22. Two other symmetrically disposed flanges 23 and 24 serve to define central section 25 and bottom section 26 of the block. All of the flanges are integral with the block proper although this is not necessary. Each of the flange sections are shown to be equal in size and disposed perpendicular to the central axis of the block. The flanges are so located as to provide a large central section 25 and two equal smaller sections 20 and 26. A slot 29 is cut through all of the flanges but 24 to provide a passage for the windings to the terminal board 15.

A second manganin winding I—J is disposed within the bottom section 26 of the block 10, while three separate copper windings C—D, E—F and G—H are separately wound in three layers one upon the other within central section 25. The windings are electrically interconnected as shown in FIGURE 5 to form a bridge circuit. Winding G—H is not electrically connected to any of the other windings; its purpose and function will hereinafter be explained.

In FIGURE 2 the block 10 is shown in perspective looking at it from the bottom thereof. Four threaded holes are provided at the bottom of the flange 24 to permit the block to be secured to the support 12. Located substantially at the center of the block and projecting approximately halfway therethrough are a plurality of equally spaced thermocouple junction holes 30 which are of equal size. These holes are generally parallel to the axis of the block and as may be seen in FIGURE 3, terminate at the center of the block. A somewhat larger hole 31 may be provided alongside holes 30 to receive a thermometer.

As can be seen in FIGURE 3, two relatively large holes 32 and 35 extend into the block from the top surface thereof. These holes extend almost all the way to the other end. A cartridge type heater 33 of a capacity of approximately 200 watts is placed within hole 35 while a thermostat 34 is received within hole 32.

The thermocouple reference block in accordance with the present invention may be used to provide a uniform and fixed temperature for a plurality of heated reference junctions to keep them all at the fixed predetermined temperature. For purposes of example only, it will be assumed that the reference junctions will all be at 150° F. Thus the block 10 must be brought to a temperature of 150° F. and there maintained.

When the block is at 150° F. the resistance of the two inner copper windings C—D and E—F will be equal to that of the two manganin windings A—B and I—J, thus the bridge of FIGURE 5 will be in balance. A control circuit for maintaining the block at 150° F. is shown in FIGURE 8. Therein for convenience the arms of the bridge are numbered 39, 40, 41 and 42 which represent windings A—B, C—D, E—F and I—J respectively. The fine heater winding G—H is shown in FIGURE 8 as 43.

In operation, the system of FIGURE 8 is energized by applying power from 115 volt 60 cycle A.C. source 50 to the central circuit over leads 51 and 52 by closing switch 53. Pilot lamp 54 will illuminate indicating the power condition.

The cartridge type coarse heater 33 will be energized as it is connected directly across the power leads 51 and 52 through leads 155 and 156. Thus, the block will be quickly brought up to a temperature just below the control level at which time the thermostat 34 which is in series with the coarse heater opens permitting control of the block temperature to be taken over by the resistance bridge magnetic amplifier system.

As was previously mentioned the block temperature is sensed by the bridge circuit whose windings are applied directly to the surface of the block.

The bridge is balanced at the desired temperature by adjustment of manganin arm 42 by use of resistor 55. The resistor 55 of FIGURE 8 is shown in FIGURE 5 as being connected intermediate D and J. Fine adjustment is provided by potentiometer 56 which is connected through resistor 57 between arms 39 and 40. The potentiometer whose total range corresponds to about 1° F. is connected across secondary winding 60 of transformer 71 with rectifier 61 being coupled therebetween. The primary winding of the transformer 71 is directly energized by the A.C. source 50.

If there should be a drop below the set temperature of 150° F., an unbalance in the bridge will result, causing a current to flow through control winding 62 of magnetic amplifier 63, thus energizing coil 64 of relay 65 through winding 66 of the magnetic amplifier 63. The contacts of relay 65 will now close to energize the fine heater winding 43 as lead 67 connected thereto will now be directly connected to winding 70 of transformer 69 which is coupled to primary winding 72, the latter winding being directly energized by the A.C. source 50. In the presently preferred embodiment of this invention, the fine heater 43, which is laid over the copper windings of the bridge within the central section of the block, dissipates approximately 10 watts. This heat will, of course, raise the temperature of the block sufficiently to reverse the bridge signal thereby opening the contacts of relay 65, thus establishing a control cycle.

The inventor has found that for a block of the following dimensions, with windings as above described control of the temperature of the block within 0.1° F. may be achieved.

The outside diameter of the block is 4½ inches with the flange sections extending approximately ½ inch therebeyond while the height of the block is approximately 4 inches. It will be understood that these dimensions are merely intended as an example of one particular design but are not to be considered a limitation upon the invention. Other dimensions may be determined by one skilled in the art.

In FIGURE 6 there is shown a basic heated reference circuit in accordance with the present invention. The block 10 is shown schematically by a rectangle and it is heated to a temperature TR which is the reference temperature herein assumed to be 150° F. A reference junction thermocouple of which there may be many is represented by two junctions 73 and 74, each of which represent one-half of the reference junction. These two halves of the thermocouple are, of course, at the same temperature, i.e., 150° F. The hot junction 75 between iron lead 76 and constantan lead 77 is the external thermocouple which senses the temperature being monitored. Leads 76 and 77 are connected to junctions 86 and 81 on terminal board 15. Two copper leads 82 and 83 are joined at 73 and 74 to connect to a control circuit, a millivoltmeter or the like as desired, to present an indication of the temperature T being measured. It will be appreciated that the device of the present invention may include a plurality of these basic heated reference junction circuits with the use of one heated block. Each thermocouple has its hot junction at the temperature being measured while the heated junction is placed within one of the holes 30 in the block 10. It has been found by the inventor that as many as fifty such holes can be satisfactorily placed within one block of the above mentioned dimensions. As each hole may accommodate two thermocouples, one hundred circuits as shown in FIGURE 6 may be effectively achieved with but one block.

In FIGURE 7A there is shown an illustrative circuit employing two heated reference junctions of the type hereinabove described which may be used to simulate a below ambient reference in accordance with the present invention. In accordance with the system of FIGURE 7A let it be assumed that hot junction 89 of the measuring thermocouple is at a temperature of 32° F. It will be desirable to have a zero output at terminals 90 and 91 when junction 89 is at 32° F. If the temperature rises thereabove, a potential should be generated at 90 to 91 which is directly proportional thereto. Thus, this system will permit a continuous measurement from a temperature above 32° F. by producing a signal of the same sign as the temperature of T increases. In operation, let it be assumed that a first block is at a temperature of 150° F., the block being represented by rectangle 93. A second heated reference junction block is represented by rectangle 101. If the junction 89 measuring temperature T consists of an iron lead 103 and a constantan lead 104 a potential of 3.41 millivolts will be produced across terminals 105 and 106 which lead from copper wires 108 and 107 to the heated block 93. It is therefore necessary to cancel out this voltage by one having an equal magnitude and an opposite polarity. If the block 101 is heated to a temperature of 263° F. and a junction 110 including iron lead 111 and constantan lead 112 is placed within one of its thermocouple junction holes a voltage of +3.41 millivolts will be generated at terminals 113 and 114 over copper leads 115 and 116 which are connected at junctions 118 and 117 within block 93.

While the example hereinabove explained has been described with reference to the use of particular thermocouple materials, other thermocouple materials such as Chromel-constantan may be used. In fact, it might be desired to use Chromel-constantan in the lower temperature block because of its high output potential. Should Chromel-constantan instead of iron-constantan be used in the example the higher temperature block would be maintained at a temperature 242° F. rather than 263° F. as given in the example.

It should further be pointed out that situations may arise where the two blocks can not be kept at the proper temperature for the reference temperature required, as for example, when several types of thermocouple materials must be used in different channels in the same box. For the illustration given above, for example, if Chromel-Alumel thermocouples were used, the 150° F. and 242° F. temperatures would not be suitable with any of the common thermocouple materials in the bucking channel. The Chromel-Alumel thermocouple products 2.66 millivolts between 32° F. and 150° F. The closest couple between 150° F. and 242° F. would be an iron-constantan thermocouple which generates 2.76 millivolts. Therefore, a loading resistor 160 in the FIGURE 7A embodiment may be used between the terminals 113 and 114 to load the output of the iron-constantan bucking thermocouple until it gives exactly 2.66 millivolts. By the same token, a loading resistor 161 may be used for the same purposes by the terminals 117 and 118 in the FIGURE 7B embodiment. If the resistance of the iron-constantan circuit between the two terminals in question were to be, for example, 2 ohms, the resistor 160 or 161 would be 53.2 ohms in order to achieve the desired voltage. The loading resistor and its associated leads should be made of either a single material or of materials which have a very low thermo-electric coefficient relative to one another. It is therefore most convenient to merely use a single length of resistance wire between the two points.

It will be understood that block 93 and block 101 may both be of the same design as hereinabove described and may be controlled by means similar to that shown in FIGURE 8 to constantly maintain their respective temperatures.

With a voltage of −3.41 millivolts at terminals 105 and 106 and a voltage of +3.41 millivolts at terminals 113 and 114, there will obviously be zero volts across terminals 90 and 91 with terminals 106 and 113 being shorted together by lead 120. Thus, the entire system within dotted box 121 acts as a 32° F. reference junction without the use of an ice bath by employing a "bucking" junction. It is appreciated that effectively the same result could have been achieved, i.e., bucking out the −3.41 volts across terminals 90 and 91 by the use of a standard battery having a potential of +3.41 millivolts. While such a method might be practical for one thermocouple or perhaps several, it hardly would be so with as many as one hundred or any substantial number less than one hundred which can be accommodated by the system of the present invention. Further, the present invention system offers a far more accurate and reliable reference than would a battery controlled system.

Inasmuch as terminals 106 and 113 are interconnected, a simplified version would permit the elimination of one of the junctions between them in block 93; such a system is shown in FIGURE 7B which in all respects is equivalent to that shown in FIGURE 7A.

There has thus been described a new and novel improved heated uniform thermocouple junction reference system, together with means for employing two such systems for providing an effective below ambient reference. It will be clear to one skilled in the art that by changing the parameters an effective reference temperature of less than 32° F. can be achieved. Further, this bucking system may be cascaded by using more than two blocks, i.e., three or even more may be employed. It will further be clear to one skilled in the art that the multiple block bucking system hereinabove described and hereinafter claimed need not necessarily be limited to the use of massive blocks of the type described wth reference to the one block constant temperature reference junction system. That is, the principles embodied in the bucking system may be made operative by the use of any type of constant temperature source or sources which may include any type of oven, or for that matter, any other means for maintaining and establishing a constant temperature. Any temperature source including a heated liquid, solid, gas or electrically established heat source may be used.

What is claimed as new is:

1. In a thermocouple system for measuring the temperature of a body, the combination comprising an external thermocouple adapted to be placed in intimate heat exchange relationship with a body the temperature of which is to be measured, reference temperature means consisting of first and second thermocouple junctions, means for maintaining said first and second thermocouple junctions at predetermined different temperatures so that said junctions generate potentials, means connecting said first and second thermocouple junctions together so that the potentials generated thereby are in opposed relationship, a pair of terminals and means consisting of leads electrically connecting said external thermocouple and said first and second thermocouple junctions in series between said terminals, whereby the potential of said system may be measured to determine the temperature of a body.

2. In a thermocouple system as set forth in claim 1, said maintaining means comprising a mass of material having high thermal inertia, one of said thermocouple junctions being within said mass.

References Cited in the file of this patent

UNITED STATES PATENTS

| | | |
|---|---|---|
| 1,721,556 | Harrison | July 23, 1929 |
| 1,873,421 | Kanter | Aug. 23, 1932 |
| 2,524,886 | Colander et al. | Oct. 10, 1950 |
| 2,595,814 | Rich et al. | May 6, 1952 |
| 2,616,296 | Wannamaker | Nov. 4, 1952 |
| 2,660,883 | Wyczalek | Dec. 1, 1953 |
| 2,673,465 | Goodman et al. | Mar. 30, 1954 |
| 2,683,793 | Gilmont et al. | July 13, 1954 |
| 2,696,119 | Jones | Dec. 7, 1954 |
| 2,759,089 | Elus | Aug. 14, 1956 |
| 2,830,453 | Jones | Apr. 15, 1958 |

OTHER REFERENCES

Article in "Die Warme," vol. 65, No. 2, Jan. 10, 1942, pp. 16–17, 73–341. (Copy in Sci. Lib., U.S. Patent Office.)